No. 821,362. PATENTED MAY 22, 1906.
E. & B. HOLMES & E. F. BEUGLER.
MACHINE FOR DRIVING BARREL HOOPS.
APPLICATION FILED APR. 10, 1903.

Witnesses.
L. M. Sangster.
Geo. A. Neubauer.

Inventors.
Edward Holmes
Britain Holmes
Edwin F. Beugler.
By A. J. Sangster
Attorney No. 821,362. PATENTED MAY 22, 1906.
E. & B. HOLMES & E. F. BEUGLER.
MACHINE FOR DRIVING BARREL HOOPS.
APPLICATION FILED APR. 10, 1903.

Witnesses,
L. M. Sangster
Geo. A. Neubauer

Inventors
Edward Holmes
Britain Holmes
Edwin F. Beugler
By C. J. Sangster
Attorney.

No. 821,362. PATENTED MAY 22, 1906.
E. & B. HOLMES & E. F. BEUGLER.
MACHINE FOR DRIVING BARREL HOOPS.
APPLICATION FILED APR. 10, 1903.

Witnesses.
L. M. Sangster.
G. A. Newbauer.

Inventors.
Edward Holmes
Britain Holmes
Edwin F. Beugler.
By A. J. Sangster Attorney.

No. 821,362. PATENTED MAY 22, 1906.
E. & B. HOLMES & E. F. BEUGLER.
MACHINE FOR DRIVING BARREL HOOPS.
APPLICATION FILED APR. 10, 1903.

Witnesses.

Inventors.
Edward Holmes.
Britain Holmes.
Edwin F. Beugler.
By ____ Attorney

UNITED STATES PATENT OFFICE.

EDWARD HOLMES, BRITAIN HOLMES, AND EDWIN F. BEUGLER, OF BUFFALO, NEW YORK.

MACHINE FOR DRIVING BARREL-HOOPS.

No. 821,362.　　　　Specification of Letters Patent.　　　Patented May 22, 1906.

Application filed April 10, 1903. Serial No. 151,964.

*To all whom it may concern:*

Be it known that we, EDWARD HOLMES, BRITAIN HOLMES, and EDWIN F. BEUGLER, citizens of the United States, residing at Buffalo, in the county of Erie and State of New York, have invented certain new and useful Improvements in Machines for Driving Barrel-Hoops, of which the following is a specification.

This invention relates to a machine for driving hoops on barrels or the like.

One of the features of the invention comprises a gear-wheel which transmits power to the hoop-driving mechanism and is held sufficiently against rotation in one direction by a friction device to prevent gravity carrying the hoop-driving mechanism downward and revolves in unison with the friction device in the opposite direction to raise the hoop-driving mechanism. This gear-wheel, together with its friction device, forms a combined power-transmitting and friction locking device.

Another feature has reference to one or more of the driving-arms which are arranged so that they may be moved or swung independently at an angle to the ordinary opening and closing movement of the arms to laterally separate the arms sufficiently to permit the insertion or removal of a barrel when the hoop-driving mechanism is depressed without elevating the said mechanism.

The main objects of the invention are to construct a comparatively simple, cheap, and efficient machine of this class that may be operated at a fairly high rate of speed.

The invention also relates to a number of convenient attachments and to minor details of construction, all of which will be fully and clearly hereinafter described and claimed, reference being had to the accompanying drawings, in which a preferred adaptation of the invention is shown.

In referring to the drawings for the details of the preferred adaptation of the invention like numerals designate like parts.

The frame of the machine consists of a base 1, side frame members 2, bolted to the base 1 by bolts 3, and a top piece or cross-head 4, which is bolted to the upper ends of the side frame members 2 by bolts 5. The top piece or cross-head 4 is provided with rearwardly-extending lugs which are formed to constitute bearings 6, in which a horizontally-extending counter-shaft 7 is journaled, said counter-shaft having a friction device keyed or otherwise fastened upon each end thereof. The friction devices each have a disk 8, provided with depressions 9, in which friction-blocks 10 of wood or other suitable friction material are adjustably mounted, the blocks 10 being held in position by adjusting-screws 11. (See Figs. 2 and 4.) The bearings 6 are provided with upwardly-extending portions 12, which form bearings for a horizontal sliding shaft 13, to each end of which a hub or sleeve 14, connected to one part of a collar 15, is fastened. The collar 15 fits in a groove 16 in the hub 17 of a pulley 18, which is loosely mounted near each end of the counter-shaft 7. Each of the pulleys 18 is provided with a beveled part 19, against which the blocks 10 are adapted to be forced and thus frictionally lock the pulley 18 and the friction-disk 8 together to revolve the counter-shaft 7. The counter-shaft 7 is provided with a pinion 20, keyed thereon, which meshes with a gear-wheel 21, mounted upon a horizontal driven shaft 22, which is rotatably mounted in bearings 23 on the front side of the cross-head 4. The shaft 22 is provided at or near the center of the machine with a pinion 24, meshing with a vertical rack-bar 25, upon the lower end of which is mounted the hoop-driving mechanism. This hoop-driving mechanism has a driving-head or spider 26, slidably mounted between two vertically-extending guides 26ª, extending inwardly from the side frame members 2, the driving-head 26 being provided with two guide-blocks 27ª, having vertical grooves 28ª, in which the guides 26ª fit.

Figure 3:
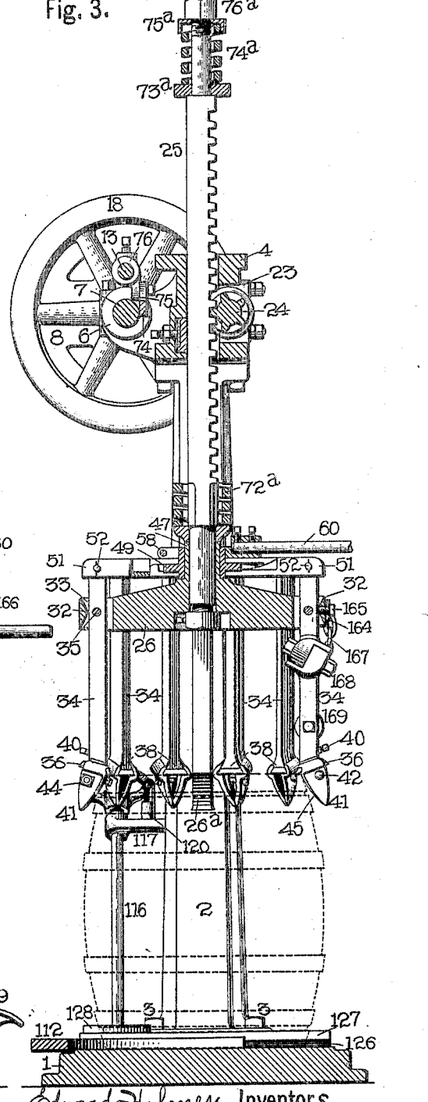
Fig. 3 is a central vertical section through the machine on line $a\,a$, Fig. 1, the central vertical rack-bar being shown in full lines.

The driving-head 26 has a central hub 27, through which the lower end of the rack-bar 25 passes, the driving-head 26 being rigidly fastened thereto by a nut 28, which fits in a recess or depression 29 in the bottom of the hub 27 and screws upon the lower screw-threaded end 30 of the rack-bar 25, the nut 30 being locked by a set-screw 31 or other device. (See Figs. 3 and 16.) The driving-head 26 is also provided with a series of radially-extending portions 32, each of which has a vertical slot 33, in which a vertical driving-arm 34 is pivoted by a pin 35, and each of the driving-arms 34 is provided with a hoop-driving device consisting of a plate 36, having its edges beveled, as at 37 in Figs. 21, 22, and 23, fastened to the enlarged lower end 38 of the driving-arms 34 by a bolt 39, locked in place by a set-screw 40. A guiding device formed of two parts 41, which have a beveled groove in their upper portions corresponding to the beveled sides of the plate 36, over which they fit, is clamped in place by a bolt 42, which passes through openings 43, in both parts and is fastened by a nut 44.

Figures 15, 16, 17, 18, 19, 20, 21, 22, 23:
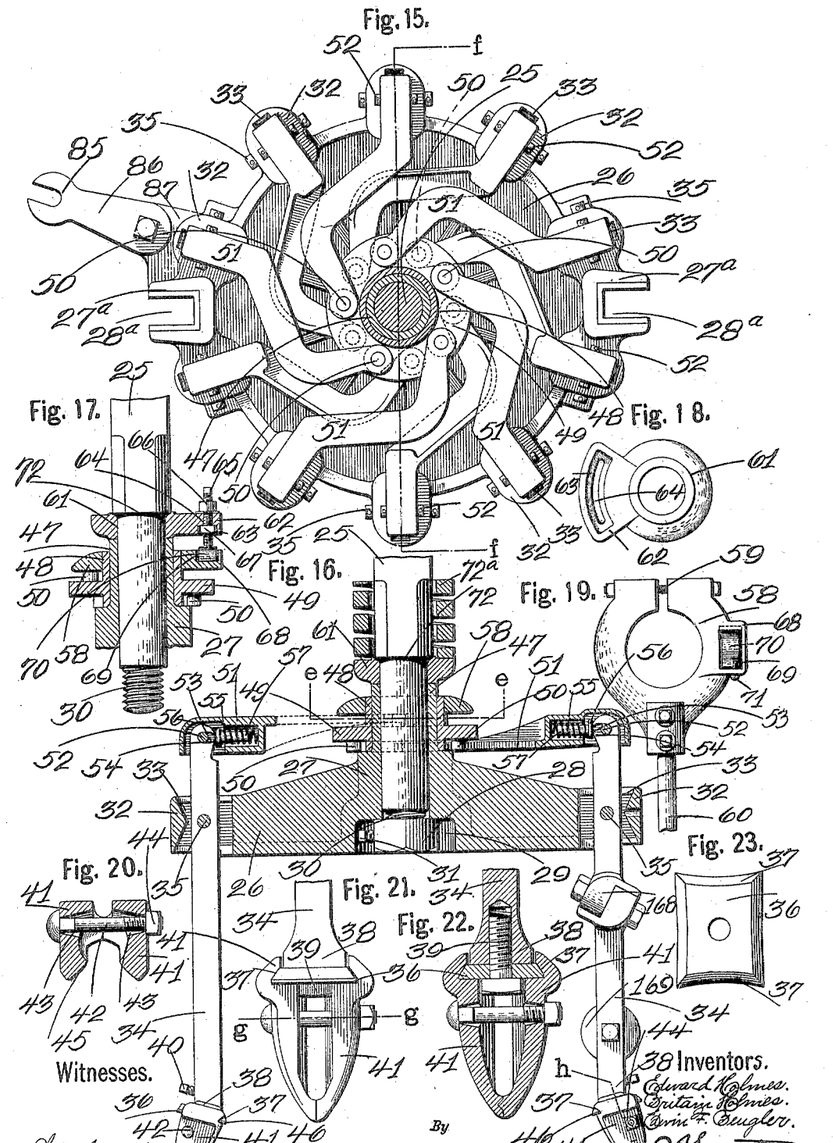
Fig. 15 is an enlarged detached plan view of the hoop-driving mechanism, also showing a section through its supporting-bar on line $e\,e$, Fig. 16.
Fig. 16 is a central section through the hoop-driving mechanism on line $f\,f$, Fig. 15, showing two of the driving-rods and the lower end of its supporting-bar.
Fig. 17 is a fragment of the lower end of the bar for supporting the hoop-driving mechanism and showing a section through the device for preventing the movement of the driving-arms.
Fig. 18 is a bottom plan view of the slotted collar encircling the lower end of the bar for supporting the hoop-driving mechanism.
Fig. 19 is a fragmentary view of the lever for operating the hoop-drivers and also a plan view of the split collar encircling the upper end of the hoop-driving mechanism.
Fig. 20 is a horizontal section through one of the hoop-driving devices on line $g\,g$, Fig. 21.
Fig. 21 is a fragmentary view of the lower end of one of the driving-bars, showing an inside view of the hoop-driving device.
Fig. 22 is an enlarged section on line $h\,h$, Fig. 16, through one of the hoop-driving devices.
Fig. 23 is a plan view of one of the beveled plates for gripping and driving the hoops.
Figures 24, 25, 26:
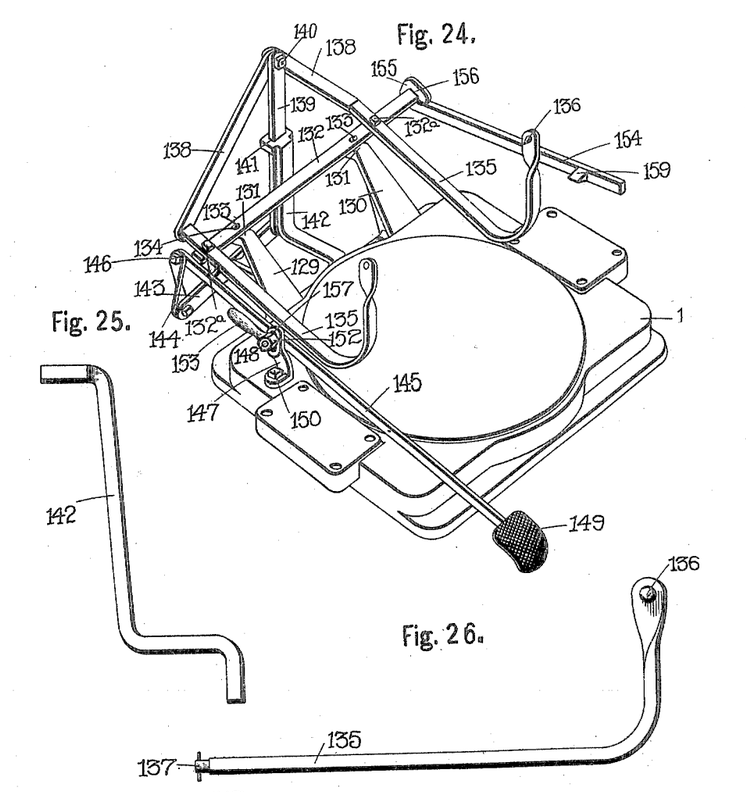
Fig. 24 is a perspective view of the base of the machine and of the barrel-turning mechanism.
Fig. 25 is an enlarged detached side elevation of the angular bar for supporting the vertical sliding bar of the barrel-turning mechanism.
Fig. 26 is an enlarged detached side elevation of one of the angular bars for gripping the barrel.
Figure 27:
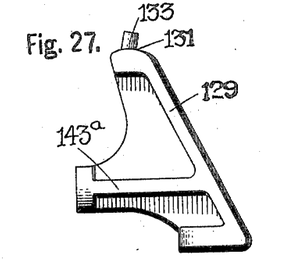
Fig. 27 is an enlarged detached side elevation of one of the diagonal supporting-brackets.
Figure 28:
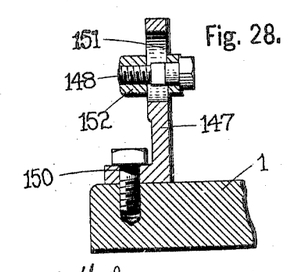
Fig. 28 is an enlarged detached fragmentary section through the base of the machine and the fulcrum of the foot-lever.

The hoop-driving device is preferably formed as shown in Figs. 16, 20, 21, and 22, the inside edge of the guiding device being curved, as shown at 45, the purpose of which is to guide the driving-arm 34 over the top of the barrel until the projecting portion 46 of the plate 36 grips the hoop and forces it upon the barrel. The hub 27 of the driving-head 26 is provided with an upwardly-extending tubular portion or sleeve 47, and a tubular sleeve 48, provided near its lower end with a horizontally-extending flange 49, loosely encircles the tubular sleeve 47, with its lower end resting upon the upper part of the hub 27. A series of pins 50 extend vertically above and below the flange 49, and a series of angular-shaped connecting-levers 51 are pivoted at their inner ends to the pins 50 and at their outer ends to the upper ends of the driving-arms 34 by pins 52, which pass through slotted openings 53 in the arms 34. The outer ends of the levers 51 are formed as shown in Fig. 16 and are provided with an elongated depression 54, in which a spiral spring 55 is seated, one end of the spring 55 abutting against the inner wall of the depression 54 and the other end being held against a flange 56, extending from one end of a pin 57, the flanged end of the pin resting against the inner edge of the driving-arm 34, thus holding the lower end thereof and the hoop-driving devices against the side of the barrel with a spring tension. The driving-arms 34 are spread or drawn together by means of a split collar 58, clamped around the upper end of the tubular sleeve 48 by a bolt 59 and provided with an operating handle or lever 60, by means of which the sleeve 48 is partially rotated upon the tubular extension 47 and through the angular levers 51, contracting or spreading the lower ends of the driving-arms 34, thus providing for different sizes of barrels.

Figures 8, 9, 10, 11, 12, 13, 14:
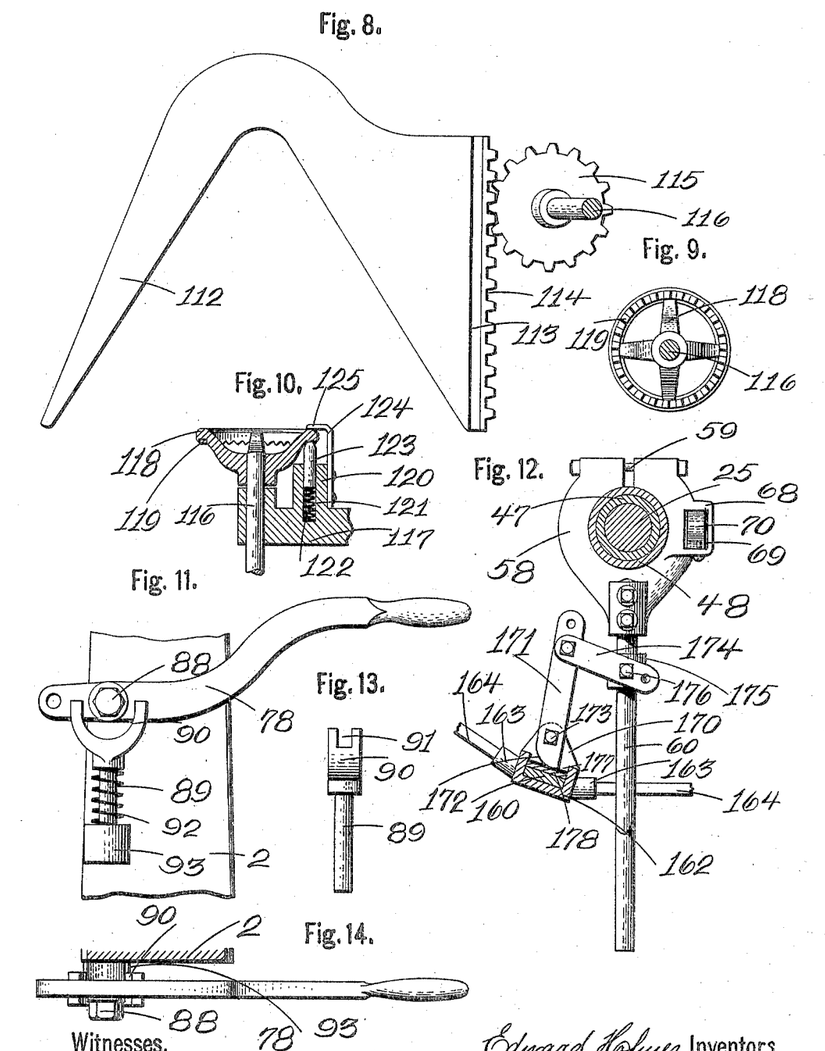
Fig. 8 is an enlarged detached plan view of the plate for centering the barrels and its operating gear-wheel.
Fig. 9 is an enlarged bottom plan view of the hand-wheel for operating the barrel-centering device, showing a section through its shaft.
Fig. 10 is an enlarged central section through the hand-wheel for operating the barrel-centering device and its upper bearing, showing the spring and pin for holding the wheel in position.
Fig. 11 is an enlarged side elevation of the operating-lever and the device for keeping it in central position and showing a fragment of the machine-frame.
Fig. 12 is an enlarged horizontal section on line $d\,d$, Fig. 1, showing the lever for operating the driving mechanism and showing a section through the device for operating the hinged driving-arms.
Fig. 13 is an enlarged end elevation of the forked bar for centering the machine-operating lever.
Fig. 14 is a plan view of the operating device and its centering mechanism shown in Fig. 11.

A device for preventing the jar of the machine from shifting the lever 60 and moving the driving-arms 34 from their adjusted position is provided, which consists of a collar 61, having an outwardly-extending portion 62, provided with a depression 63 and slot 64, through which a bolt 65 is passed, the bolt being locked in place by upper and lower lock-nuts 66 and 67, the nut 67 being placed in the depression 63. The split collar 58 is also provided with an outwardly-extending portion 68, having a depression 69, in which a spring 70, of curved form, as shown in Figs. 12, 17, and 19, is placed, being held in position by a set-screw 71.

It will be seen from the foregoing description and the drawings that when the handle 60 is moved to bring the highest portion of the spring 70 beneath the lower end of the bolt 65 the collar 58 will be rigidly held against movement by the jar of the machine. The bolt 65 may be moved in the slot 64, so as to provide for the adjustment of the driving-arms to different sizes of barrels.

The collar 61 is rigidly clamped between the upper end of the tubular sleeve 47 and a shoulder 72 on the rack-bar 25. (See Figs. 16 and 17.) A heavy coiled spring 72$^a$ is placed around the lower end of the rack-bar 25 and upon the upper surface of the collar 61 and acts to relieve the jar when the driving-head reaches its highest elevation by striking against the bottom surface of the cross-head 4. A collar 73$^a$ is placed around the upper end of the rack-bar 25 and supports a spiral spring 74$^a$, the spring being held in place by a cap 75$^a$ and nut 76$^a$, screwed upon the upper end of the rack-bar 25. This relieves the jar when the hoop-driving mechanism reaches its lowest position by striking upon the top surface of the cross-head 4.

Figure 6:
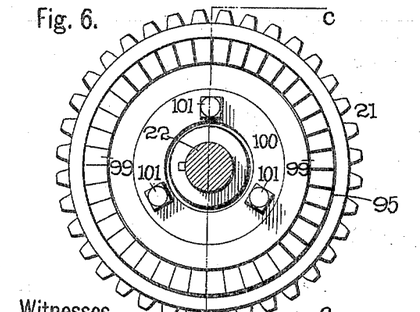
Fig. 6 is an enlarged side elevation of the gear-wheel carrying the ratchet brake mechanism, showing also a section through the main shaft.
Figure 7:
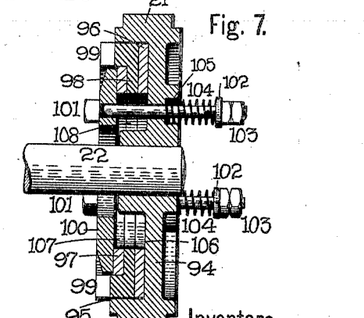
Fig. 7 is a central vertical section on line $c\,c$, Fig. 6.

The upward and downward movement of the hoop-driving mechanism is automatically stopped by means of a bell-crank 73, pivoted upon the rear side of the cross-head 4 and having one end pivoted to one end of a connecting-link 74, the other end of which is pivoted to a downwardly-extending portion 75 on a collar 76, fastened to the sliding shaft 13. The other end of the bell-crank 73 is pivoted to the upper end of a vertically-extending rod 77, which has its lower end pivoted to an operating-lever 78. The vertical rod 77 is provided with upper and lower collars 79 and 80, fastened thereto by set-screws 81 and 82, and two spiral springs 83 and 84 encircle the rod 77, the lower spring 84 being supported upon the collar 80 and the spring 83 resting upon the forked end 85 of an outwardly-extending arm 86, which has its inner end bolted to a lug 87, extending from the driving-head 26. (See Figs. 2 and 15.) The operating-lever 78 is pivoted to one of the side frame members 2 by a bolt 88, and a device for normally holding the lever in a central position is provided, which consists of a short vertical bar 89, having a forked portion 90 fitted upon its upper end, each of the forks 90 having a depression 91 in its upper end, into which the lower edge of the lever 78 is adapted to fit. A spiral spring 92 encircles the bar 79, with its upper end abutting against the forked portion 90 and its lower end resting upon a lug 93, extending from the side frame member 2 and into which the lower end of the rod or bar 87 fits and slides. The forked end 90 straddles the pivoting-point of the lever 78, and thus retains the lever in a central position. A brake device is also provided to prevent the downward movement of the hoop-driving apparatus by gravity and is preferably formed as shown in Figs. 6 and 7, where the details are shown. This brake device has a friction mechanism which is sufficient to hold the hoop-driving mechanism in any position and against which the hoop-driving mechanism is driven downward by power and a ratchet locking mechanism, which locks the friction mechanism against movement in the direction required to lower the hoop-driving mechanism and permits easy movement in the direction necessary to elevate the hoop-driving mechanism. The advantage of this novel construction is that but slight power is necessary to lower the hoop-driving mechanism, as the friction is just about equal to holding said mechanism stationary, and the ratchet permits the mechanism to be freely elevated, as it relieves the same from the friction.

The gear-wheel, together with its friction, forms a combined driving and braking device which is operated by power to raise and lower the hoop-driving mechanism and also locks it against downward movement when the power is released.

The gear-wheel 21, mounted upon the shaft 22, has a solid web portion 94, which extends from the rim of the wheel to the hub and forms a depression 95 in one side, in which the brake mechanism is fitted. This mechanism consists of two rings 96 and 97, of wood or other suitable friction material, between which is placed a metal ring or plate 98, having an annular series of ratchet-teeth 99 around its outer portion. Another metal plate 100 is placed upon the friction-ring 97, being held in place by a number of bolts 101, which pass through openings in the plate 100 and web 94 and are provided at their outer ends with washers 102 and lock-nuts 103. A spiral spring 104 encircles each of the bolts 101, being seated in a depression 105 in the outer face of the web 94, their outer ends abutting against the washers 102. The purpose of the springs is to hold the disks 96 and 97 and metal ring 98 and plate 100 against the inner face of the web 94 with a spring tension. The friction-rings 96 and 97 and metal ring 98 are provided with central openings 106, 107, and 108, through which the bolts 101 pass, so as to permit the rotation of the gear-wheel 21 while the friction-rings and ratchet ring or plate are held stationary. A pawl 109 is pivoted to one of the bearings 6 and has one end engaging with the ratchet-teeth 99 in the ring 98, being held in engagement therewith by means of a spiral spring 110, which encircles a rod 111, one end of the rod being pivoted to the pawl 109 and the opposite end fastened to the cross-head 4. (See Fig. 4.) The pawl 109 engaging in the teeth 99 of the ring 98 prevents the backward rotation of the ring, and as the ring 98 is held between the disks 96 and 97, which are frictionally locked to the inner face of the web 94 by means of the springs 104, the weight of the hoop-driving apparatus acting upon the pinion 24, shaft 22, and gear-wheel 21 is not sufficient to overcome this friction, and the wheel 21 is held stationary. When, however, power is applied to the pinion 20, the friction between the web 94 and disk 97 is overcome, and the gear-wheel 21 revolves, thus lowering the driving-head 26 and driving the hoop upon the barrel.

An adjustable device is provided for centering barrels of different sizes and is preferably formed as follows: A metal plate 112, having a V-shaped depression, is provided with a groove 113, formed in the upper surface of one end of the plate, and one edge of the plate is provided with a series of gear-teeth 114, with which a gear-wheel 115, mounted upon the lower end of an upwardly-extending shaft 116, meshes. The upper end of the shaft 116 is supported by a bearing-bar 117, fastened to one of the side frame members 2, and a hand-wheel 118, provided with a series of V-shaped depressions 119, cut into the lower surface of the rim thereof, is mounted on the upper end of the shaft 116. The bar 117 is provided with an extension 120, having a depression 121, in which a spring 122 and pin 123 are seated. The pin 123 has its upper end beveled, as shown in Fig. 10. The beveled end of the pin seats in one of the V-shaped depressions 119 and prevents the rotation of the wheel 118 and shaft 116 by the jar of the machine. A strip of metal 124 is fastened to the other side of the extension 120 and has its upper end bent, as shown at 125 in Figs. 1, 3, and 10, the object of which is to prevent the hand-wheel 118 from disengaging from the pin 123. A plate 126, provided with a downwardly-extending flange 127 at its inner end, is bolted to the base 1, so that the flange 127 fits in the groove 113 in the plate 112 and acts as a guide therefor. The plate 126 has a raised portion 128, which acts as a bearing for the lower end of the shaft 116 and also as a seat for the gear-wheel 115.

Figure 1:
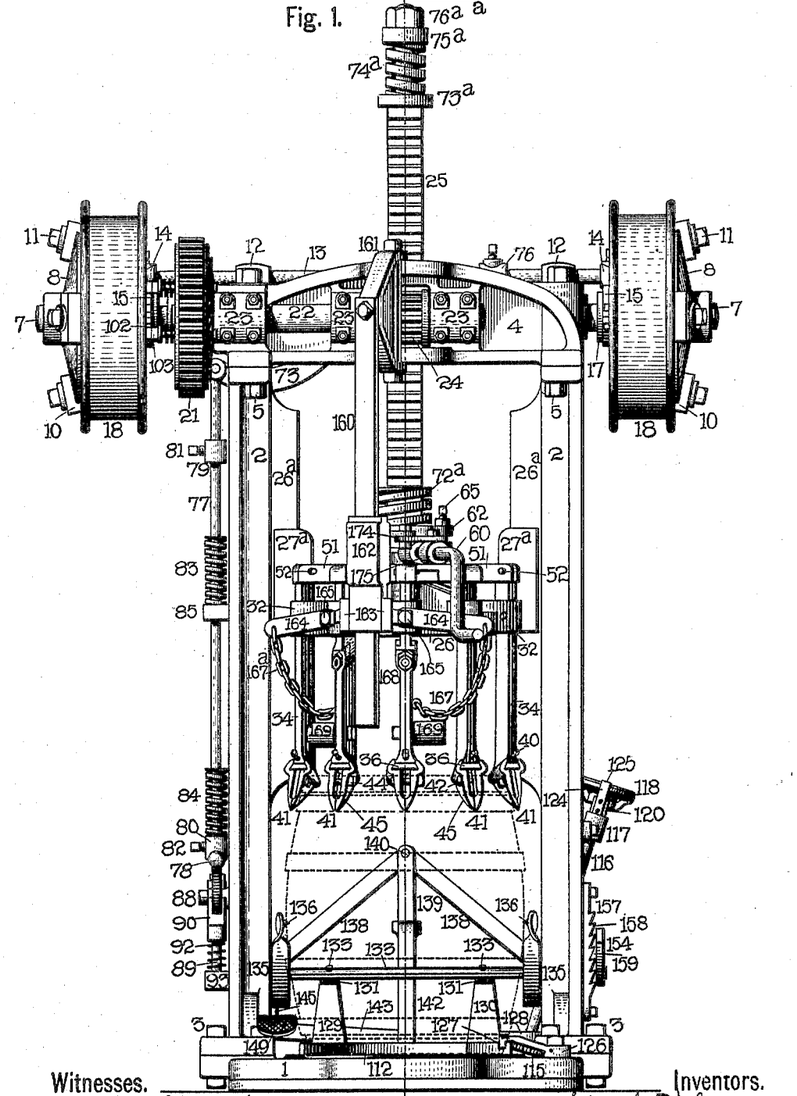
Figure 1 is a front elevation of the improved machine.
Figure 2:
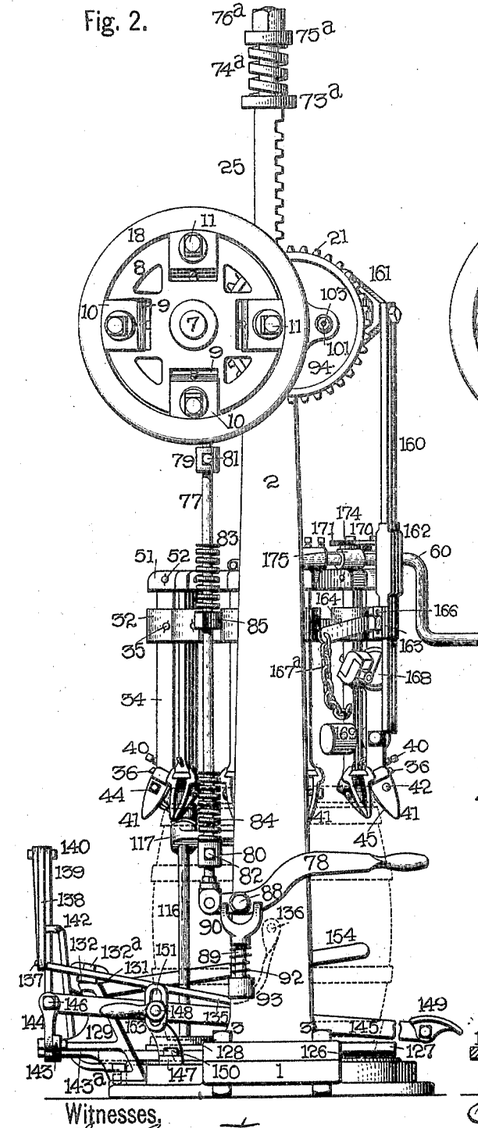
Fig. 2 is a side elevation of the improved machine.
Figure 4:
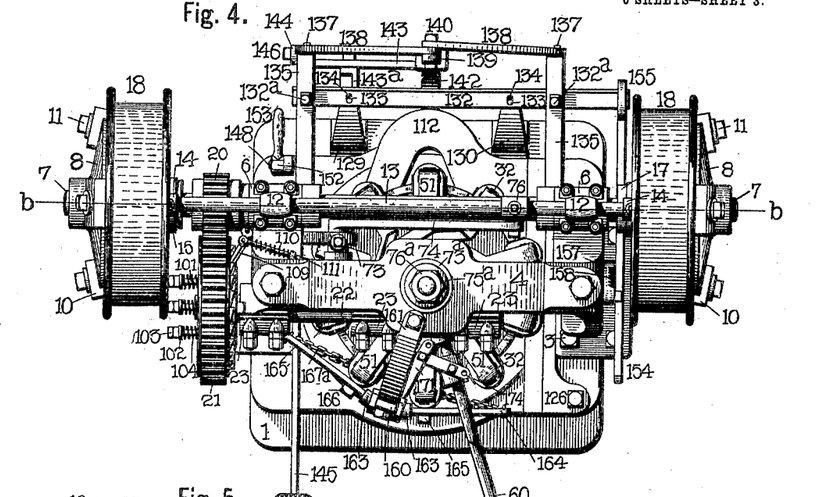
Fig. 4 is a plan view of the machine.
Figure 5:
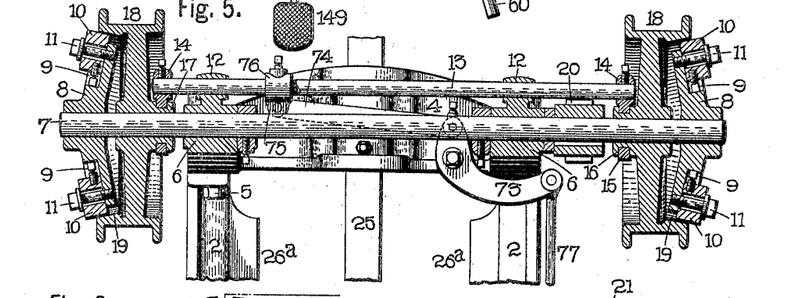
Fig. 5 is a fragmentary rear elevation of the upper part of the machine, showing a section through the friction driving mechanism on line $b\,b$, Fig. 4.

A means for turning the barrel after the hoops have been driven upon one end is provided, which is preferably formed as shown in Figs. 1, 2, and 4. Two upwardly-extending and rearwardly-extending portions 129 and 130 are fastened to the base 1 of the machine and have their upper ends beveled, as at 131 in Figs. 1 and 2. A horizontally-extending bar 132 rests upon the beveled ends of the portions 129 and 130, being held in place by pins 133, which pass through slots 134 in the bar 132. The pins 133 are seated in the portions 129 and 130 and extend at right angles to the beveled surface 131. Two angular bars 135 extend at approximately right angles to the bar 132 and are pivoted thereto by bolts 132$^a$. The forward ends of the bars 135 are bent, as shown, and are provided with cone-shaped pins 136, which are adapted to grip the barrel, and the rear portions of the bars 135 are provided with cylindrical-shaped ends 137, which pass through openings in the lower ends of two levers 138, which extend upwardly and inwardly and are connected at their upper ends to a vertically-extending bar 139 by a pin 140. The bar 139 passes through an opening 141 in the upper end of an angular-shaped bar 142, having its lower end bent and bolted to the base 1, as shown, and a connecting-lever 143, pivoted at its middle to an extension 143$^a$ on the portion 129 has its inner end pivoted to the lower end of the bar 139 and its outer end pivoted to the lower end of a short vertical connecting-link 144, the upper end of which is pivoted to the rear end of a foot-lever 145 by a bolt 146. The foot-lever is pivoted to a fulcrum-bar 147 by a bolt 148 and is provided at its outer end with a foot-treadle 149. The fulcrum-bar 147 is bolted to the base 1 by a bolt 150 and has a slot 151, through which the bolt 148 passes, the pivoting-bolt 148 being locked in place by a lock-nut 152, which is preferably provided with an operating-handle 153, so that the nut 152 may be easily locked or unlocked to provide for the adjustment of the lever 145.

An adjusting-lever 154 for adjusting the height of the bars 135 is provided, which has its rear end bent upon itself, as shown at 155 in Fig. 2, the bent portion forming an opening 156, through which the end of the bar 132 passes. The opening 156 is so formed as to allow a certain range of movement to the bar 132. In order to hold the lever 154 in its adjusted position, a bar 157, having a series of teeth 158 formed upon one side thereof, is bolted to the outside of one of the frame members 2, and the lever 154 is provided with a projecting portion or lug 159, which fits between two of the teeth 158 and holds the lever firmly in position.

A device is provided by means of which the barrel may be removed from the machine before the hoop-driving mechanism has been entirely raised above the barrel, and it is preferably formed as shown in Figs. 1, 2, 4, and 12. A vertically-extending bar 160 is fastened at its upper end to a bracket 161, bolted to the cross-head 4, and a sleeve 162, having outwardly-extending portions 163, is loosely fitted on the bar 160 and adapted to slide thereon. Two levers 164 are pivoted to two of the radially-extending portions 32 by bolts 165, and the inner ends of the levers 164 are loosely seated in depressions 166 in the extensions 163. The outer end of one of the levers 164 is connected to one of the driving-arms 34 by a chain 167, and the outer end of the other lever 164 is connected to another driving-arm 34 by another chain 167ª, as shown in Fig. 1. Each of these two driving-arms 34 is formed in two parts connected together by a hinge 168 to permit the lower portion of these two arms 34 to swing outward. Weights 169 are bolted to the two hinged arms 34 to normally keep them in a vertical position. The sleeve 162 is provided with two inwardly-extending lugs or ears 170, between which a lever 171, having a cam-shaped end 172, is pivoted by a bolt 173. The opposite end of the lever 171 is pivoted to one end of a connecting-link 174, pivotally secured at its other end to a collar 175, mounted on the lever 60, by a bolt 176, which also rigidly fastens the collar 175 around the lever 60. The cam end of the lever 171 passes through an opening 177 in the inner side of the sleeve 162 and operates against a plate 178, which is fitted between the bar 160 and the inner wall of the sleeve.

The operation of the machine is as follows: A barrel is placed in position upon the base of the machine, as shown in dotted lines in Figs. 1, 2, and 3, and the hoop which is to be driven into place upon the barrel is placed around the upper end thereof. The lever 78 is now moved, and by means of the rod 77, bell-crank 73, and connecting-link 74 the shaft 13 is moved to bring one of the pulleys 18 into frictional engagement with its adjacent friction-clutch. This starts the shaft 7 revolving, and by means of the pinion 20 and gear-wheel 21 the shaft 22 is revolved, and the pinion 24, revolving with the shaft 22, carries the rack-bar 25 downward. The lever 60 is now moved to draw the drivers together sufficiently to grip the hoop, and the downward movement of the driving-head forces the hoop upon the barrel. When the hoop has been driven upon the barrel and the lever 60 is moved to release the drivers from the head and the driving-head has nearly reached its lowest position, the forked end 85 of the arm 86 comes in contact with the spring 84 and carries the rod 77 downward far enough to move the shaft 13 and disengage the pulley 18 from the friction-disk 8. The lever 78 is then moved in an opposite direction and the shaft 13 moved in an opposite direction to the operation first described, thus bringing into contact the pulley and friction-disk upon the other end of the shaft 7 and reversing the rotation of the shaft 22, whereby the driving-head is raised until the spring 83 strikes the collar 79 and moves the rod 77 sufficiently to disengage the pulley 18 and friction-disk 8, thereby stopping the movement of the driving-head. Another hoop is placed upon the barrel and the operation is repeated. After the hoops have been driven upon one end of the barrel the foot-lever 145 is depressed, causing the vertical bar 139 to be drawn downward by means of the link 144 and connecting-lever 143 and spreading the rear ends of the bars 135, thereby embedding the cone-points of the pins 136 in the barrel sides and slightly below the center. After the barrel has been gripped by the pins the continued downward movement of the lever 145 depresses the rear ends of the bars 135 and raises the barrel from the base of the machine. The barrel being gripped below the center will turn, and the foot-lever being released the bars 135 will lower the barrel upon the base, and the remaining hoops are driven on, as before described. The barrel may be removed from the machine before the drivers have entirely been raised above the top, if desired, and the operation of this mechanism is as follows: After the hoop has been driven upon the barrel, the lever 60 is moved to release the drivers from the hoops, and by means of the connecting-link 174 the cam end 172 of the lever 171 is brought into contact with the plate 178, thus frictionally fastening the sleeve 162 to the bar 160. The upward movement of the driving-head carries the pivoting-points 165 of the levers 164 upwardly, and by means of the chains 167 and 167ª the lower portions of the hinged driving-arms are swung outwardly, permitting the removal of the barrel. When the lever 60 is moved to close the drivers, the cam 172 releases the plate 178, and the drivers resume their normal position. Referring to the means for locking the driving-shaft to the frame to prevent the dropping of the hoop-driving mechanism, the friction-brake is arranged so the friction-rings are held against the gear-wheel with just sufficient pressure to hold the hoop-driving mechanism from dropping by gravity, and when power is applied to lower the hoop driving mechanism the gear-wheel rotates against the face of the friction-ring. The advantage of this construction is that it dispenses with a heavy weight for counterbalancing the hoop-driving mechanism and forms a combined power transmitting and locking device. The pulleys 18 are belted to a source of power, so as to revolve in opposite directions, so that one pulley is employed to raise the hoop-driving mechanism and the other to lower it.

We claim as our invention—

1. In a vertical hoop-driving machine, a frame, a horizontal counter-shaft journaled in said frame, a friction-pulley on said counter-shaft, a pinion on the counter-shaft, a horizontal driving-shaft, a gear-wheel on the driving-shaft meshing with the pinion on the counter-shaft, a pinion on the driving-shaft, a rack-bar meshing with the pinion on the driving-shaft, hoop-driving mechanism mounted on the lower end of the rack-bar and a friction device for preventing involuntary downward movement of the hoop-driving mechanism without interfering with its free upward movement, substantially as set forth.

2. In a machine of the character described, a frame, two shafts journaled in said frame, intermeshing gear-wheels operatively connecting said shafts; one of said gears having a friction-brake element mounted directly upon it which is freely rotatable in one direction, a pinion on one shaft, a friction driving device on the other, a vertical rack-bar meshing with the pinion and hoop-driving mechanism having support from the vertical rack-bar, substantially as set forth.

3. In a machine of the character described, a frame, a plurality of shafts journaled in said frame, means operatively connecting said shafts; one of said connecting means having a friction brake element mounted directly upon it which is freely rotatable in one direction, a pinion on one shaft, a friction driving device on another, a vertical rack-bar meshing with the pinion and hoop-driving mechanism having support from the vertical rack-bar, substantially as set forth.

4. In a machine of the character described, a frame having a base, a cross-head and connecting frame members, a counter-shaft journaled in the cross-head, a friction-pulley on the said counter-shaft, a pinion on the counter-shaft, a driving-shaft, a gear on the driving-shaft meshing with the pinion on the counter-shaft, a pinion on the driving-shaft, a vertical rack-bar meshing with the pinion on the driving-shaft, hoop-driving mechanism mounted on the lower end of the rack-bar and a friction device adapted to engage the gear-wheel on the driving-shaft for preventing downward movement of the hoop-driving mechanism when the counter-shaft is relieved from the friction-pulley and said friction device being freely rotatable in the opposite direction, substantially as set forth.

5. In a machine of the character described, a frame, a plurality of shafts journaled in said frame, means operatively connecting said shafts, a pinion on one shaft, a friction driving device on another, a vertical rack-bar meshing with the pinion, hoop-driving mechanism having support from the vertical rack-bar and a friction brake device on the first-mentioned shaft engaging one of the elements of the connecting means for preventing downward movement of the hoop-driving mechanism by gravity; said friction-brake being freely rotatable to raise the hoop-driving mechanism, substantially as set forth.

6. In a machine of the class described, a frame, a shaft in said frame, pulleys mounted near opposite ends and normally loose on said shaft, means for rotating said pulleys in opposite directions, frictional means for operatively connecting either one of said pulleys to said shaft and hoop-driving mechanism adapted to be raised and lowered by the rotation of said shaft and frictional means for retarding the rotation of the shaft in one direction sufficiently to prevent the dropping of the hoop-driving mechanism when both pulleys are loose on the shaft; said frictional means being freely rotatable in the opposite direction, substantially as set forth.

7. In a machine of the class described, a driving mechanism having a plurality of depending pivoted driving-arms, at least one of which is at least in part movable in a path at an angle to the ordinary opening and closing movement of the arms on their pivots, whereby it may be swung to one side to permit the removal of a barrel, substantially as set forth.

8. In a machine of the class described, a driving mechanism having a plurality of depending pivoted driving arms, at least one of which has hinged sections with one section thereof having a movement at an angle to the radial opening and closing of the arms for the purposes specified.

9. In a machine of the character described, a frame, a plurality of shafts journaled in said frame, gear-wheels operatively connecting said shafts, a pinion on one shaft, a rack-bar meshing with said pinion, a driving friction on one of said shafts and a braking friction device and consisting of a friction-ring, a ring having an annular series of ratchet-teeth, a pawl attached to the frame and engaging the teeth and springs for holding the friction-ring against the face of one of the gear-wheels, substantially as set forth.

10. In a machine of the class described, a driving mechanism having a plurality of depending pivoted driving-arms, at least one of which is in sections and a pivot-pin hinging said sections which extends in radial alinement with the common center of the driving-arms, for the purposes specified.

11. In a machine of the class described, a driving mechanism consisting of a driving-head, a series of depending driving-arms pivoted to said head and one or more of said arms being in sections hinged to each other and said sections having a movement at an angle to the radial opening and closing pivotal movement of the arms, substantially as set forth.

12. In a machine of the class described, a driving mechanism having a plurality of depending pivoted driving-arms, at least one of which is hinged so as to have an independent swinging movement at an angle to the radial opening and closing movement of the arm and a weight attached to said hinged arm.

13. In a machine of the class described, a driving mechanism having a plurality of depending pivoted driving-arms, two of which at least are hinged and adapted to swing from each other on their hinges at an angle to the ordinary radial opening and closing movement of said arms for the purposes specified.

14. In a machine of the class described, a driving mechanism having a plurality of depending pivoted driving-arms, two of which at least are hinged and adapted to swing from each other on their hinges at an angle to the radial opening and closing movement of said arms and means for swinging said hinged arms from each other sufficiently for the passage of a barrel.

15. In a machine of the class described, a driving mechanism consisting of a driving-head, a series of driving-arms pivoted to said head, a hoop-driving device on each arm having a beveled-edge plate and a guide having beveled grooves corresponding to the beveled edge of the plate, substantially as set forth.

16. In a vertical hoop-driving machine, the combination with an upright frame having a base upon which a barrel is adapted to be supported upon one of its ends, hoop-driving mechanism mounted in the upper portion of the frame vertically above the base, and means for vertically raising and lowering said hoop-driving mechanism, of means for elevating and pivotally supporting a barrel at two opposite points whereby it may be turned after the hoops have been driven upon one end.

17. In an upright hoop-driving machine, the combination with an upright frame having a barrel-supporting base, hoop-driving mechanism in the frame above the base, of pivot-bars for engaging a barrel at two opposite points and means for supporting and elevating said pivot-bars whereby the barrel may be turned by hand without removing it from the machine, substantially as set forth.

18. In a hoop-driving machine, the combination with hoop-driving mechanism, of a support for a barrel or the like beneath the hoop-driving mechanism, and means for elevating and pivotally supporting the barrel or the like above said support at two opposite points whereby said barrel or the like may be turned without removing it from the machine, substantially as set forth.

19. In a machine of the class described, a frame, a plurality of shafts journaled in said frame, a pinion on one shaft, a vertical rack-bar meshing with said pinion, hoop-driving mechanism having support from said rack-bar, a gear-wheel on one shaft and a combined power-transmitting gear and friction locking device on another shaft meshing with the last-mentioned gear-wheel, and rotatable freely to elevate the hoop-driving mechanism and against friction to lower the hoop-driving mechanism, substantially as set forth.

20. In a machine of the class described, the combination with the hoop-driving mechanism of means for raising and lowering said hoop-driving mechanism, including a gear-wheel, friction means engaging said gear-wheel and sufficient to hold the hoop-driving mechanism against gravity descent and means whereby said friction means is disengaged from the gear-wheel when said gear-wheel is rotated in a direction to raise the hoop-driving mechanism and frictionally locked to the gear-wheel when said gear-wheel is rotated in a direction to lower the hoop-driving mechanism, substantially as set forth.

21. In a hoop-driving machine, the combination with hoop-driving mechanism, of means for supporting a barrel so that it may be turned after the hoops have been driven upon one end, comprising two bars having sharpened ends adapted to grip the barrel between them and means for elevating said bars whereby the barrel may be turned by hand, substantially as set forth.

22. In a hoop-driving machine, the combination with hoop-driving mechanism, of a support for a barrel or the like beneath the hoop-driving mechanism, and means for elevating and pivotally supporting the barrel or the like above said support at two opposite central points whereby said barrel or the like may be turned by hand without removing it from the machine, substantially as set forth.

23. In a hoop-driving machine, the combination with hoop-driving mechanism, of two angular bars having sharpened points adapted to grip a barrel, levers connecting to the bars, a vertical bar connecting to the levers, a second angular bar operatively connecting to the vertical bar, a foot-lever and connections between the foot-lever and the second angular bar, substantially as set forth.

24. In a machine of the class described, the combination with the hoop-driving mechanism, of means for raising and lowering said hoop-driving mechanism, including a gear-wheel, friction means engaging said gear-wheel and sufficient to hold the hoop-driving mechanism against gravity descent, and means for preventing rotation of the friction means in a direction to lower the hoop-driving mechanism; said friction means being rotatable in unison with the gear-wheel in the opposite direction, substantially as set forth.

EDWARD HOLMES.
BRITAIN HOLMES.
EDWIN F. BEUGLER.

Witnesses:
L. M. SANGSTER,
GEO. A. NEUBAUER.